United States Patent
Kaczmarski et al.

(10) Patent No.: US 6,314,424 B1
(45) Date of Patent: Nov. 6, 2001

(54) SYSTEM AND METHOD FOR DYNAMICALLY EXPANDING AND COLLAPSING A TREE VIEW FOR AN HTML WEB INTERFACE

(75) Inventors: Michael Allen Kaczmarski, Tucson, AZ (US); Randy Yuan-Yi Tung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,442

(22) Filed: Sep. 28, 1998

(51) Int. Cl.$^7$ ..................................................... G06F 17/30
(52) U.S. Cl. ........................... 707/10; 707/100; 707/103; 707/513; 707/517; 707/531; 709/218; 709/224; 345/340; 345/357
(58) Field of Search .................................. 707/8, 10, 100, 707/200, 201, 203, 531, 513, 517, 2.3, 4, 5, 104, 501; 709/212, 216, 237, 248, 310, 218, 224; 345/340, 357

(56) References Cited

U.S. PATENT DOCUMENTS

| | | | |
|---|---|---|---|
| 5,615,325 | 3/1997 | Peden | 395/326 |
| 5,801,702 | * 9/1998 | Dolan et al. | 345/357 |
| 5,848,410 | * 12/1998 | Walls et al. | 707/4 |
| 5,870,559 | * 2/1999 | Leshem et al. | 709/224 |
| 5,903,889 | * 5/1999 | de la Huerga et al. | 707/3 |
| 5,935,210 | * 8/1999 | Stark | 709/224 |
| 5,987,454 | * 11/1999 | Hobbs | 707/4 |
| 6,003,040 | * 12/1999 | Mital et al. | 707/103 |
| 6,016,486 | * 1/2000 | Nichols | 706/46 |
| 6,026,413 | * 2/2000 | Challenger et al. | 707/202 |
| 6,035,330 | * 3/2000 | Astiz et al. | 709/218 |
| 6,088,698 | * 7/2000 | Lipkin | 707/10 |
| 6,105,028 | * 8/2000 | Sullivan et al. | 707/10 |
| 6,112,203 | * 8/2000 | Bharat et al. | 707/5 |
| 6,138,113 | * 10/2000 | Dean et al. | 707/2 |
| 6,177,936 | * 1/2001 | Cragun | 345/340 |
| 6,211,877 | * 4/2001 | Steele et al. | 345/357 |

FOREIGN PATENT DOCUMENTS 9-146962   6/1997   (JP) ................................ G06F/17/30

OTHER PUBLICATIONS

Kleinberg, Jon M., "Authoritative Sources in a Hyperlinked Environment", Journal of the ACM, vol. 46, No. 5, Sep. 1999, pp. 604–632.*

T. Munzner et al., "Visualizing the Structure of the World Wide Web in 3D Hyperbolic Space", Symposium on the Virtual Reality Modeling Language, San Diego, Dec. 14–15, 1995: VRML '95.

K. Wittenburg et al., "Visual Focusing and Transition Techniques in a Treeviewer for Web Information Access", IEEE Symposium on Visual Languages, Isle of Capri, Italy, Sep. 23–26, 1977.

* cited by examiner

*Primary Examiner*—Hosain T. Alam
*Assistant Examiner*—Shahid Alam
(74) *Attorney, Agent, or Firm*—Noreen A. Krall; Abdy Raissinia (57) ABSTRACT

The present invention provides a system and method for expanding and collapsing a tree view from a web interface by using HTML to build the visual representation of the web server's information structure, which has the capability to preserve previous tree expansion states in the stateless web HTML environment. In a method according to the present invention, a request comes in from a client browser which contains a universal resource locator (URL). The web server passes the URL to the tree HTML page generation engine to generate the collapsible/expandable tree. The tree HTML page generation engine server will call the corresponding query modules according to the information passed in from the URL. A linked list is generated according to the results returned from one of the query modules. The linked list is then passed into the tree HTML page generation engine. The tree HTML page generation engine generates the HTML page containing nodes. Each node has an embedded URL associated with it and contains a special encoding to memorize the tree expansion state information. The generated tree view is then returned to the web server and then to the browser.

13 Claims, 9 Drawing Sheets

Key To
*FIG. 5*

*FIG. 5a*

```
<HEAD><TITLE>ADSM Server Administration</TITLE></HEAD>
<BODY bgcolor=#FFFFFF><IMG SRC="/file/ADSMSERV.GIF"><br>
ADSM Server for Windows NT - Version 3, Release 1, Level 0.0

<br>
Connected to Server ADSM_RTUNG as Administrator P.
<hr noshade size=6>
<b>ADSM Server Administration</b>
<P>
<table border=0 cellpadding=0 cellspacing=0>

<tr>
<td width=32><A HREF=/ADMIN/P/529d1daaa22578el/about><img src="/file/DSMSERV.GIF
"border=0></A></td><td colspan=5 NOWRAP>  <A HREF=/ADMIN/P/529d1daaa22578e
1/about>ADSM Server Administration</A></td>

<tr>
<td width=32><IMG SRC="/file/TBAR.GIF"></td>
<td width=32><A HREF=/ADMIN/P/529d1daaa22578el/class/ADMIN><img src="/file/ADMIN
S.GIF" border=0></A></td><td colspan=4 NOWRAP>  <A HREF=/ADMIN/P/529d1daaa2
2578el/class/ADMIN>Administrators</A></td>

<tr>
<td width=32><A HREF=/ADMIN/P/529d1daaa22578el/group/MAIN21022002000200200200 2
02011100102000200000020000022020200020200002000000000002000000000000200000><im
g src="/file/TPLUS.GIF" border=0></A></td>
<td width=32><A HREF=/ADMIN/P/529d1daaa22578el/group/SCHEDULER><img src="/file/C
SCHED.GIF" border=0></A><td><td colspan=4 NOWRAP>   <A HREF=/ADMIN/P/529d1d
aaa22578el/group/SCHEDULER>Central Scheduler</A></td>
```

```
<tr>
<td width=32><A HREF=/ADMIN/P/529d1daaa22578el/group/MAIN13102200200020020020020
02011100102000200000020000022020200020200002000000000002000000000000200000><i
mg src="/file/TPLUS.GIF" border=0></A></td>
<td width=32><A HREF=/ADMIN/P/529d1daaa22578el/class/DB><img src="/file/DBASE.GIF"
border=0></A><td><td colspan=4 NOWRAP>    <A HREF=/ADMIN/P/529d1daaa22578
el/class/DB>Database</A></td>

<tr>
<td width=32><A HREF=/ADMIN/P/529d1daaa22578el/group/MAIN16102200200020020020020
02011100102000200000020000022020200020200002000000000002000000000000200000><i
mg src="/file/TPLUS.GIF" border=0></A></td>
<td width=32><A HREF=/ADMIN/P/529d1daaa22578el/class/LOG><img src="/file/RLOG.GIF"
border=0></A></td><td colspan=4 NOWRAP>    <A HREF=/ADMIN/P/529d1daaa22578
el/class/LOG>Recovery Log</A></td>

<tr>
<td width=32><IMG SRC="/file/TBAR.GIF"></td>
<td width=32><A HREF=/ADMIN/P/529d1daaa22578el/class/FILESPACE><img src="/file/F
SPACES.GIF" border=0></A></td><td colspan=4 NOWRAP>  <A HREF=/ADMIN/P/529d1
daaa22578el/class/FILESPACE>File Spaces</A></td>

<tr>
<td width=32><A HREF=/ADMIN/P/529d1daaa22578el/group/MAIN19102200200020020020020
02011100102000200000020000022020200020200002000000000002000000000000200000><i
mg src="/file/TPLUS.GIF" border=0></A></td>
<td width=32><A HREF=/ADMIN/P/529d1daaa22578el/class/NODE><img src="/file/NODES.
GIF" border=0></A><td><td colspan=4 NOWRAP>    <A HREF=/ADMIN/P/529d1daaa225
```

*FIG. 5b*

SYSTEM AND METHOD FOR DYNAMICALLY EXPANDING AND COLLAPSING A TREE VIEW FOR AN HTML WEB INTERFACE

BACKGROUND OF THE INVENTION

1. Field of the Invention

The present invention relates generally to displaying data on the internet, and more particularly to dynamically expanding and collapsing a tree view for an HTML web interface.

2. Description of Related Art

Web browser technology has propelled the internet to what has now become a pervasive and nearly universal superhighway whereby a wealth of information can be readily retrieved and delivered to any requesting end user. As the level of activities on the internet increases, more and more information is available for search and viewing by the end user. Despite efforts to index and catalog this wealth of information, information access and subsequent visual access is one of the main challenges in developing a web based application server presently. In the internet environment, the successful implementation of the web application server is determined by how the information that resides on the server can be effectively presented or conveyed to the users. Although much of the data that resides on various servers has hierarchical properties, allowing users to traverse the server and access the hierarchical information is a difficult task. To achieve this, it takes web administrators a tremendous amount of time and effort to create and maintain a tree structured interface. This is primarily due to the rapid information changes on the server, the real time requirements of the users and limitations inherent in Hypertext Markup Language or HTML.

Wittenburg et all, "Visual Focusing and Transition Techniques in a Treeviewer for Web Information Access", IEEE Symposium on Visual Languages, Sep. 23–26, 1997 at page 20, Column 2 discusses the problem, stating "Yahoo"(http://www.yahoo.com) is a good representative of a design implemented in HTML. The presentation of search hits is augmented with HTML links representing paths of its large classification tree from the root down to local categories under which hits appear. This helps to organize the hit sets and to yield a context for evaluating their relevance. However, when users try to directly interact with the category tree itself, say by opening or closing its branches, only one level of the tree is visible at a time and an entirely new HTML page must be rendered. Maintenance of any other context information, say, the current hit set, is not done across views. Even though users can constrain their search to a single branch of the category tree, they cannot control or define multiple foci within a single view.

Prior art technologies using HTML to present the visual display of the information are static and administratively difficult to maintain, while those using JAVA are browser dependent and slow or inefficient to execute. Therefore, there is a need for an efficient and rapid access to the wealth of information on the world wide web that addresses the complexities of displaying the data while meeting the real time needs of the end user.

SUMMARY OF THE INVENTION

To overcome the shortcomings of the prior art described above, it is an object of the present invention to provide an improved method for expanding and collapsing a tree view from a web interface.

It is another object of the present invention to provide a method for quickly and efficiently accessing deeper levels of information in a tree view web interface while maintaining the currency of the information displayed.

Still another object of the present invention is to provide a system and method for expanding and collapsing a tree view from a web interface that is independent of the browser being used or the level of the browser being used.

Briefly stated, the present invention provides a system and method for expanding and collapsing a tree view from a web interface by using HTML to build the visual representation of the web server's information structure, which has the capability to preserve previous tree expansion states in the stateless web HTML environment.

In a networked application in a heterogeneous environment comprising one or more application servers running on one or more computer platforms utilizing one or more operating systems, and further comprising one or more remote heterogeneous client platforms requiring a hierarchical interface to traverse into the web based application server(s), the present invention provides a system for generating a visual representation of the application servers information in a tree structure which imbeds the tree expansion states directly into the icons of the tree structure to provide access to information in deeper tree levels which is faster and easier to use.

In a method according to the present invention, a request comes in from a client browser which contains a universal resource locator (URL) and information about the request such as encoding for the state information. The web server passes the additional information to the tree HTML page generation engine to generate the collapsible/expandable tree. The tree HTML page generation engine will call the corresponding query modules according to the information passed in from the URL. A linked list is generated according to the results returned from one of the query modules. The linked list is then passed back to the tree HTML page generation engine. The tree HTML page generation engine turns the linked list into an HTML page containing nodes and leaves. Each node has an embedded URL associated with it and contains a special encoding to memorize the tree expansion state information. The generated tree view is then returned to the web server and then to the browser.

An advantage of the present invention is that it provides an improved method for displaying data in a web interface.

Another advantage of the present invention is that it reduces the manual effort involved in implementing the web interface.

Still Another advantage of the present invention is that it reduces the effort involved in maintaining the interface when the information displayed is updated on that server.

Still another advantage of the present invention is the improvement of usability of the web interface, which helps users to access information quickly in deeper levels.

Still another advantage of the present invention is the use of HTML to generate the visual representation (tree view) for the web interface, which provides a solution that uses HTML constructs that are supported on a very wide variety of browsers, and are not dependent on browser support levels for Java or Java Script.

Yet another advantage of the present invention is the preservation of the state information directly in the HTML tags, so the previous state will always be expanding and collapsing.

The above, as well as additional objects, features and advantages of the present invention will become apparent in the following detailed written description.

DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
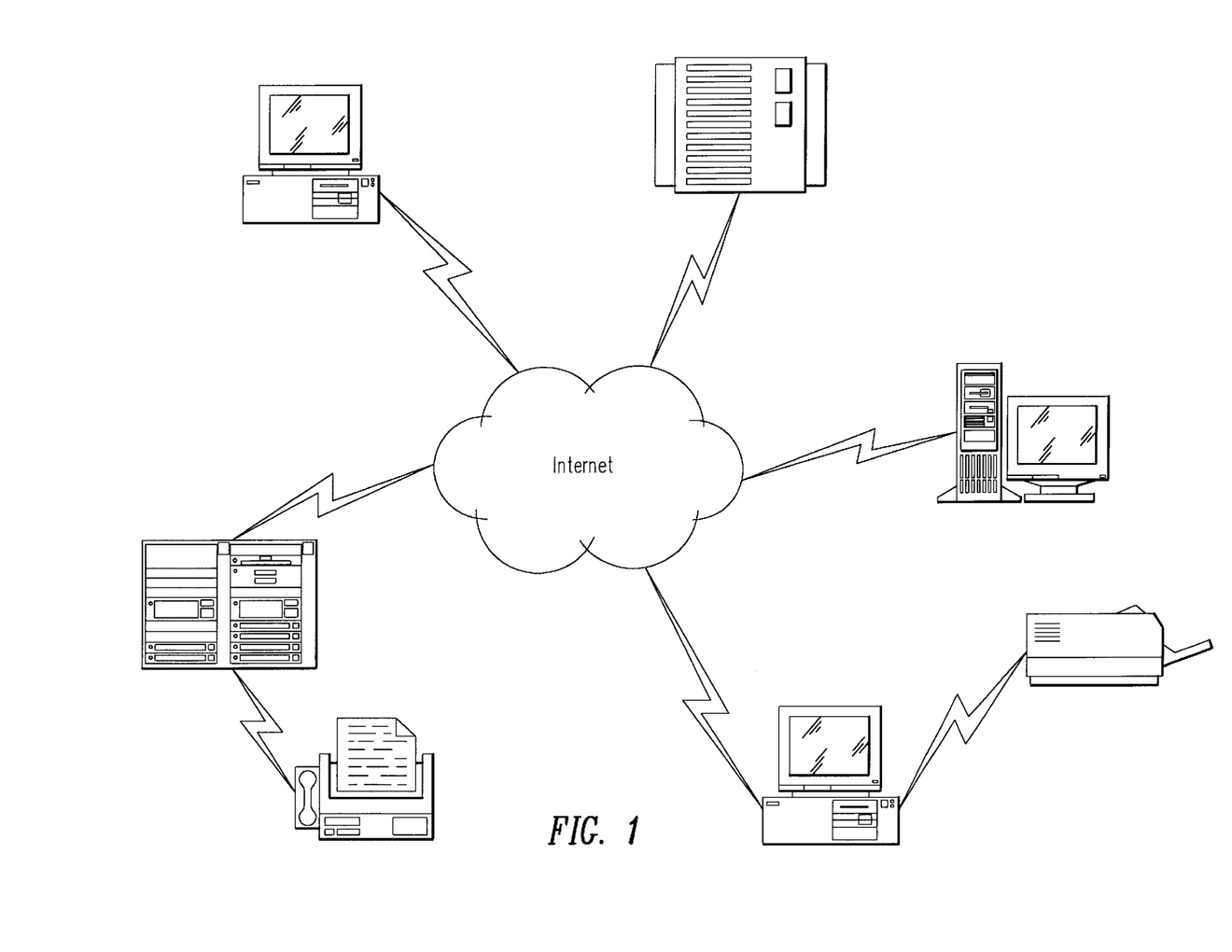
FIG. 1 illustrates typical networked applications including a number of servers and clients.

The presently preferred method and apparatus, referring to FIG. 1, takes place between a server and a client in an interconnected network of computers such as the internet or intranet, where any one of the machines can be a sever or a client with respect to any other machine.

Figure 2:
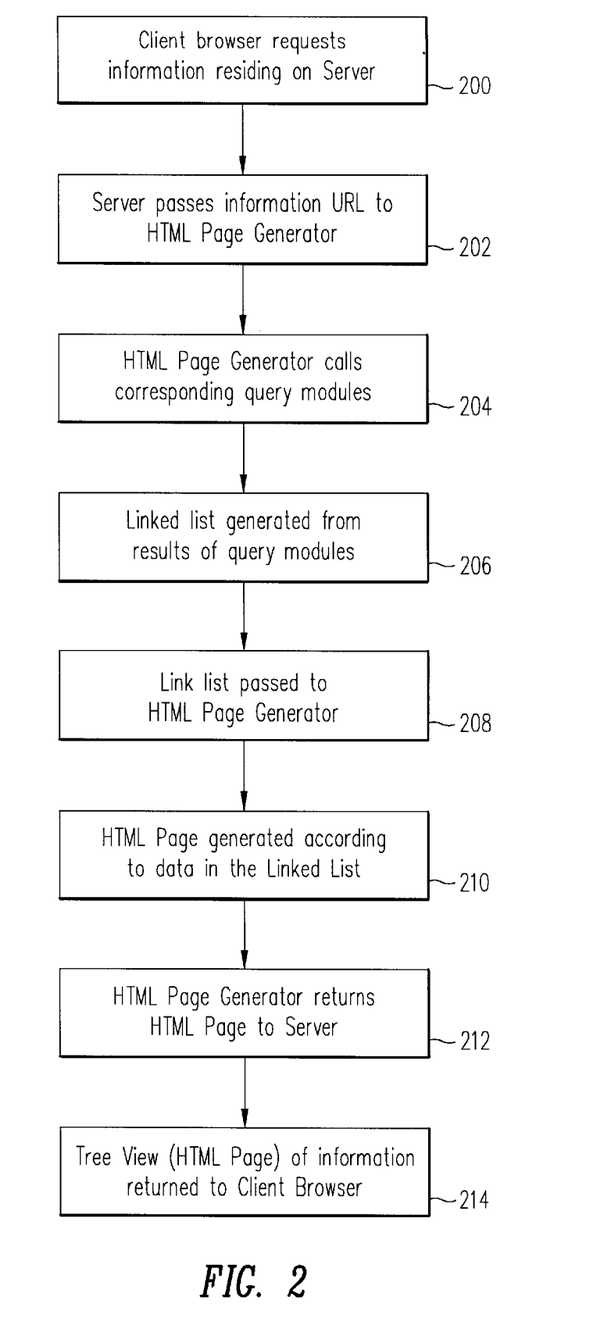
FIG. 2 is a flow chart generally illustrating the principal steps of a presently preferred embodiment of the present invention.
Figure 4A:
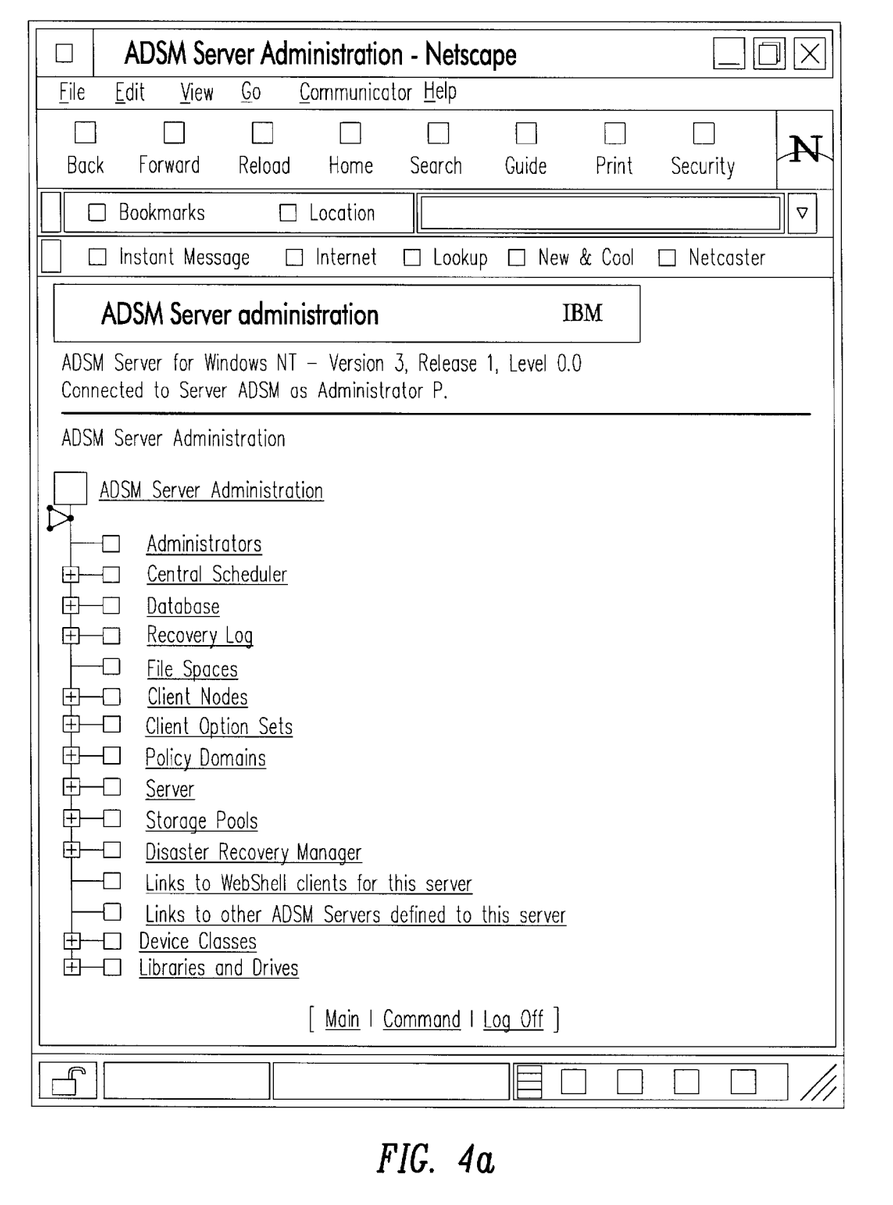
FIGS. 4(a)–4(d) illustrate a specific application of the preferred embodiment showing the expanding and collapsing of nodes in a visual representation of the system and method according to the preferred embodiment.
Figure 4B:
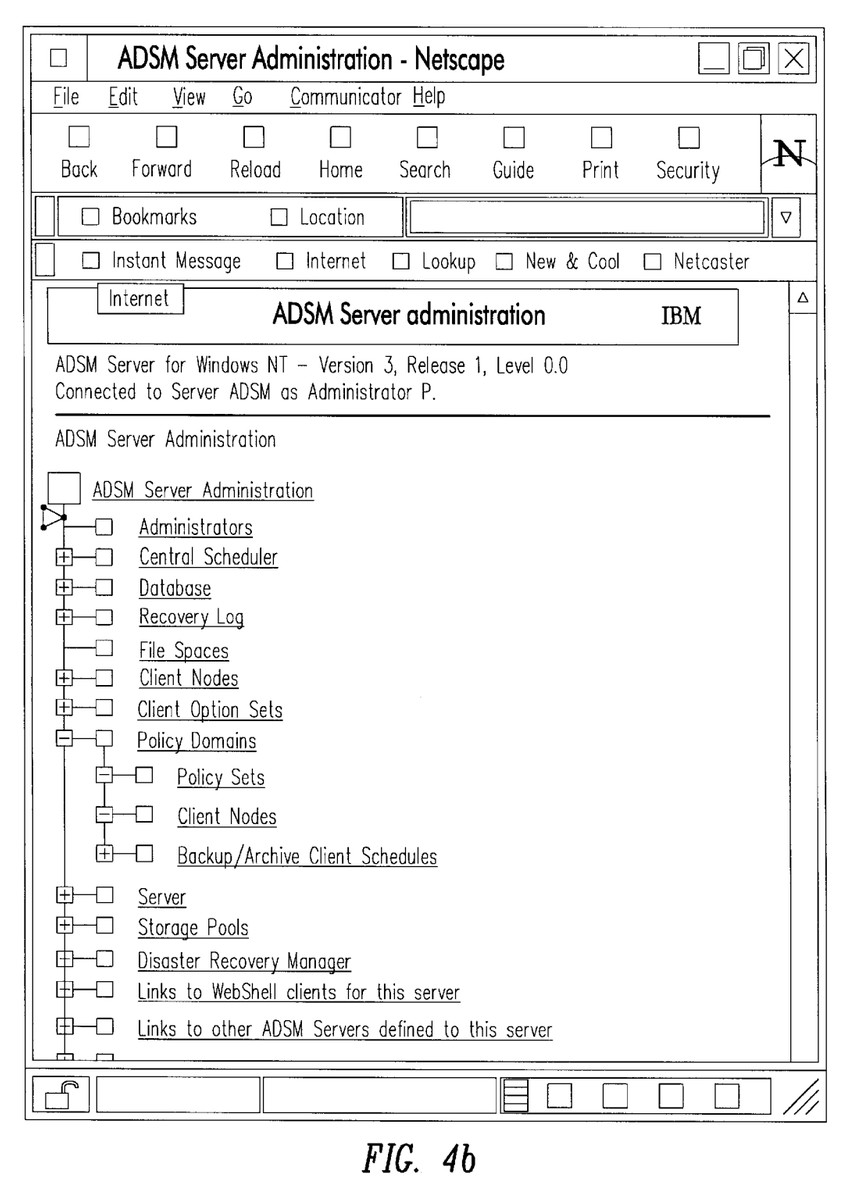
Figure 4C:
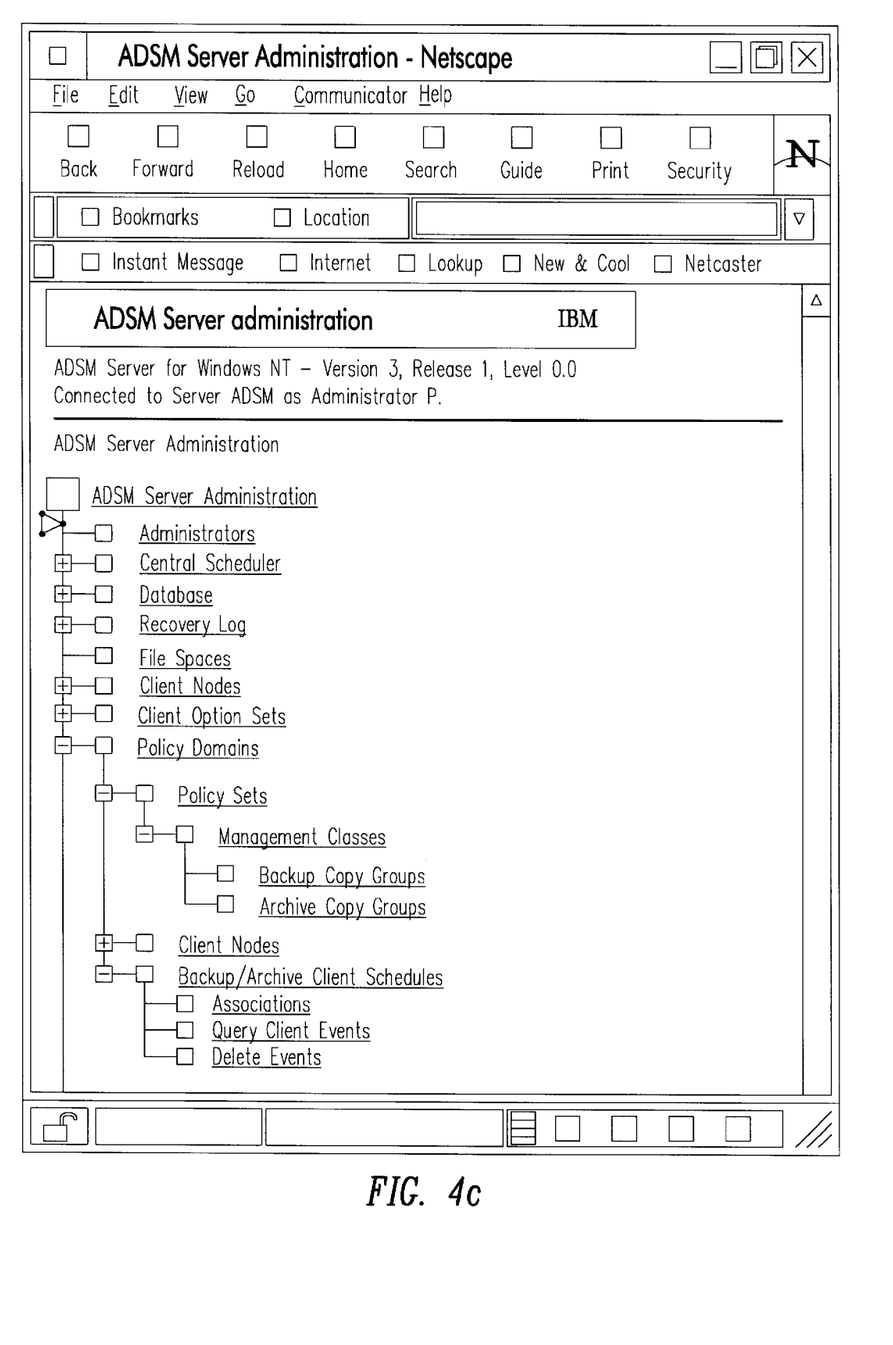
Figure 4D:
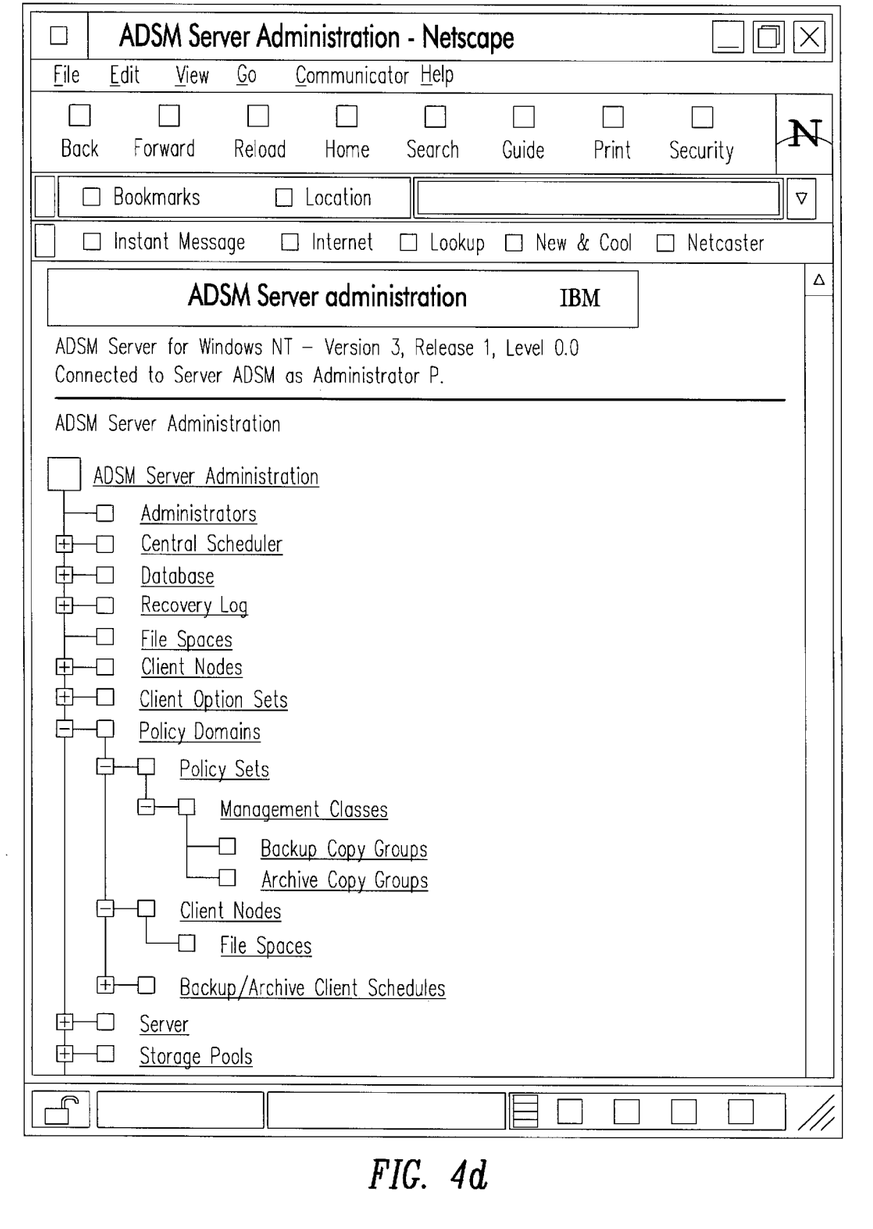
Figures 5, 5A:
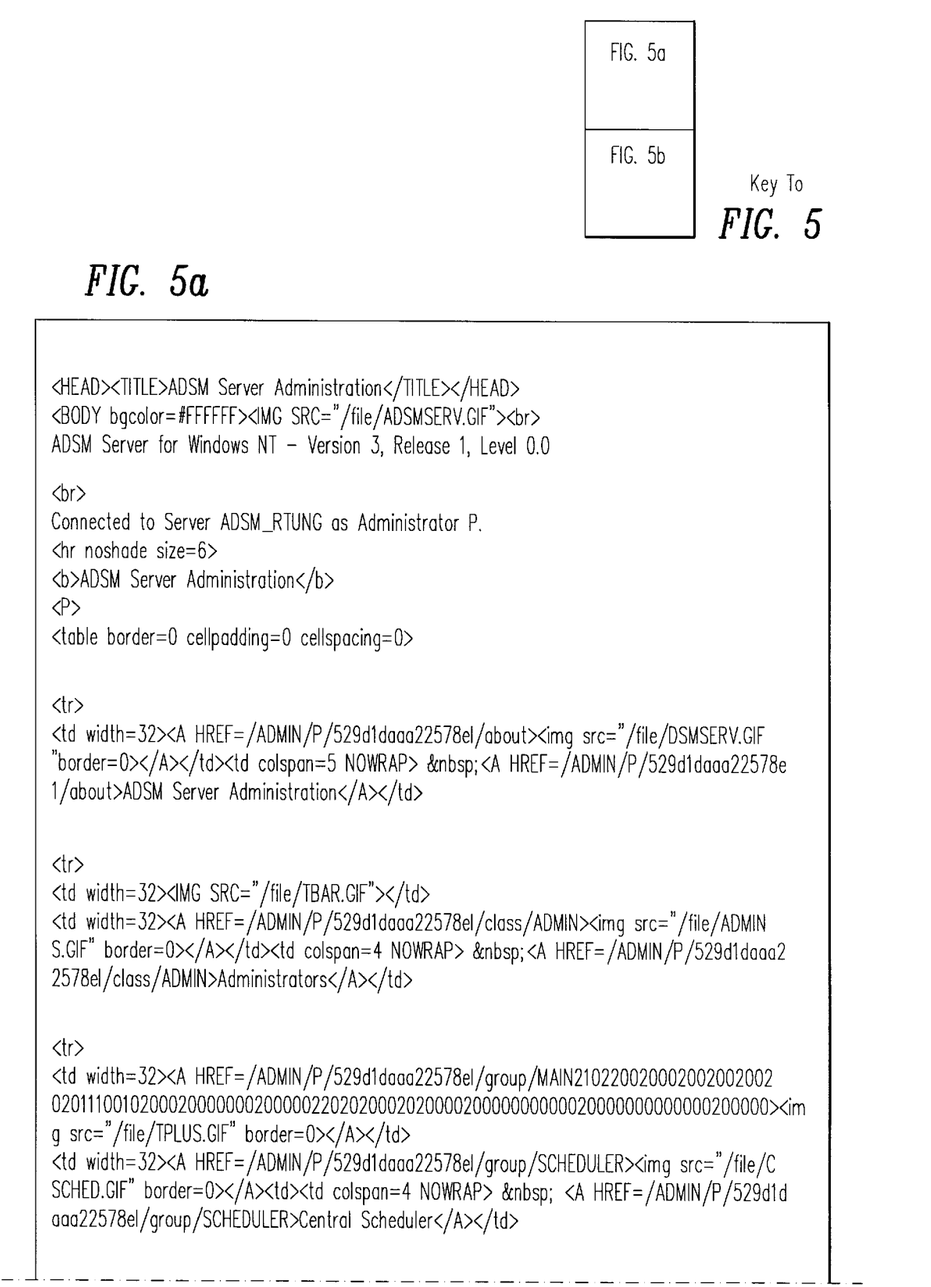
FIG. 5 is an example of a portion of an HTML page generated according to the system and method of the present information.
Figure 5B:
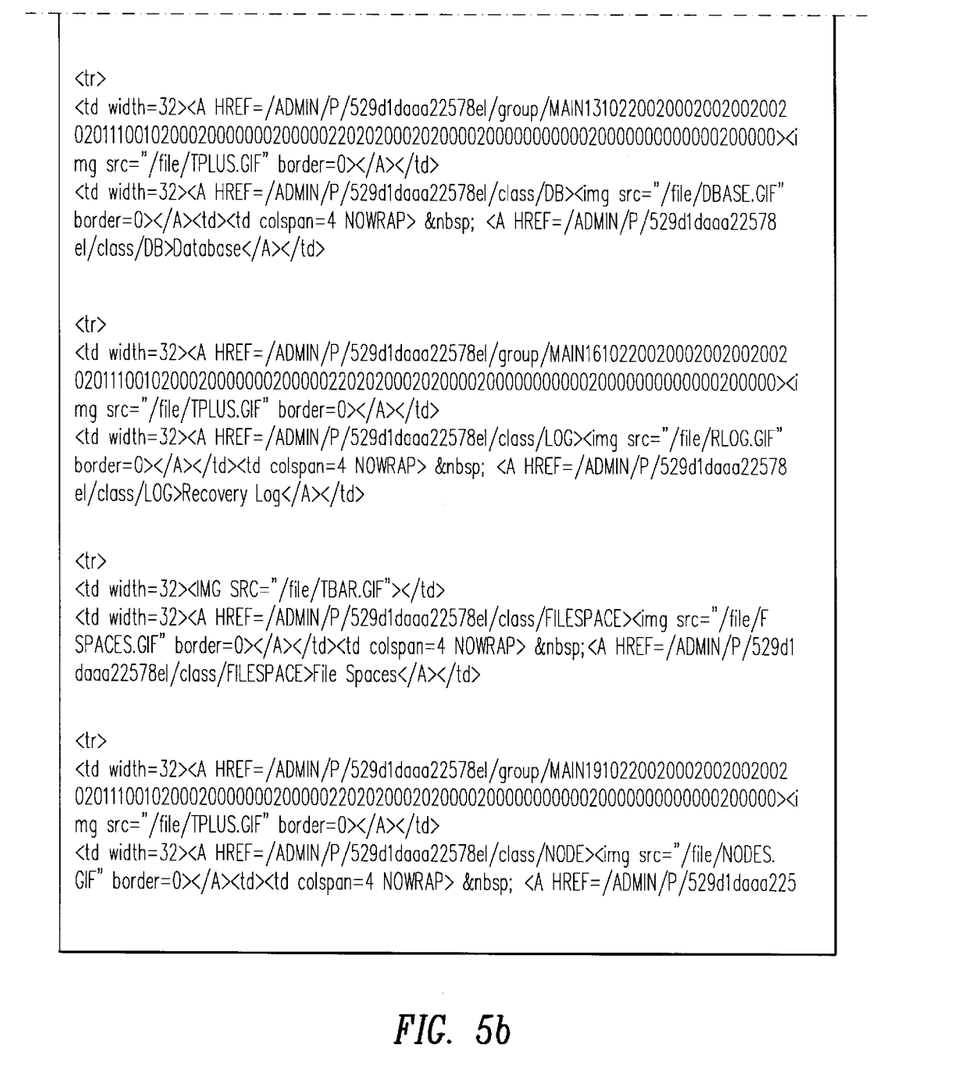

FIG. 2 is a flow diagram illustrating the general steps of the present invention. In a first step, illustrated by box 200, a client browser makes a request to the web server. The request from the client browser contains a universal resource locator (URL). The request could be a URL typed in by the user to initiate the first contact with the web server or a URL encoded in a previously generated tree view node in the web page. At 202, the web server passes the URL to the tree HTML page generation engine to generate the collapsible/ expandable tree. The generated tree serves as a traversing tool to the existing information system. The tree HTML page generation engine server will call the corresponding query modules according to the information passed in from the URL at 204. Next, at 206, a linked list is generated according to the results returned from one of the query modules. This linked list contains all the data needed for constructing a tree representation for the information (such as a database, file system, network domains and the like). The linked list is then passed into the tree HTML page generation engine at 208. The tree HTML page generation engine generates the HTML page containing nodes and leaves. As will be seen with reference to FIGS. 4(a)–4(d), the nodes are actually the "+" (plus) sign and the "−" (minus) sign which can be clicked by users to collapse or expand a branch. Each node has an embedded URL associated with it and contains a special encoding to memorize the tree expansion state information. This information will get updated and carried over to the next generated tree (web page) to preserve the previous expansion state. The leaves (entries in the tree view without plus or minus signs) are also URLs, which point to actual data that the user wishes to receive. An example of a portion of an HTML page generated is illustrated in FIG. 5. The generated tree view is then returned to the web server at 212 and then to the browser at 214.

Figure 3:
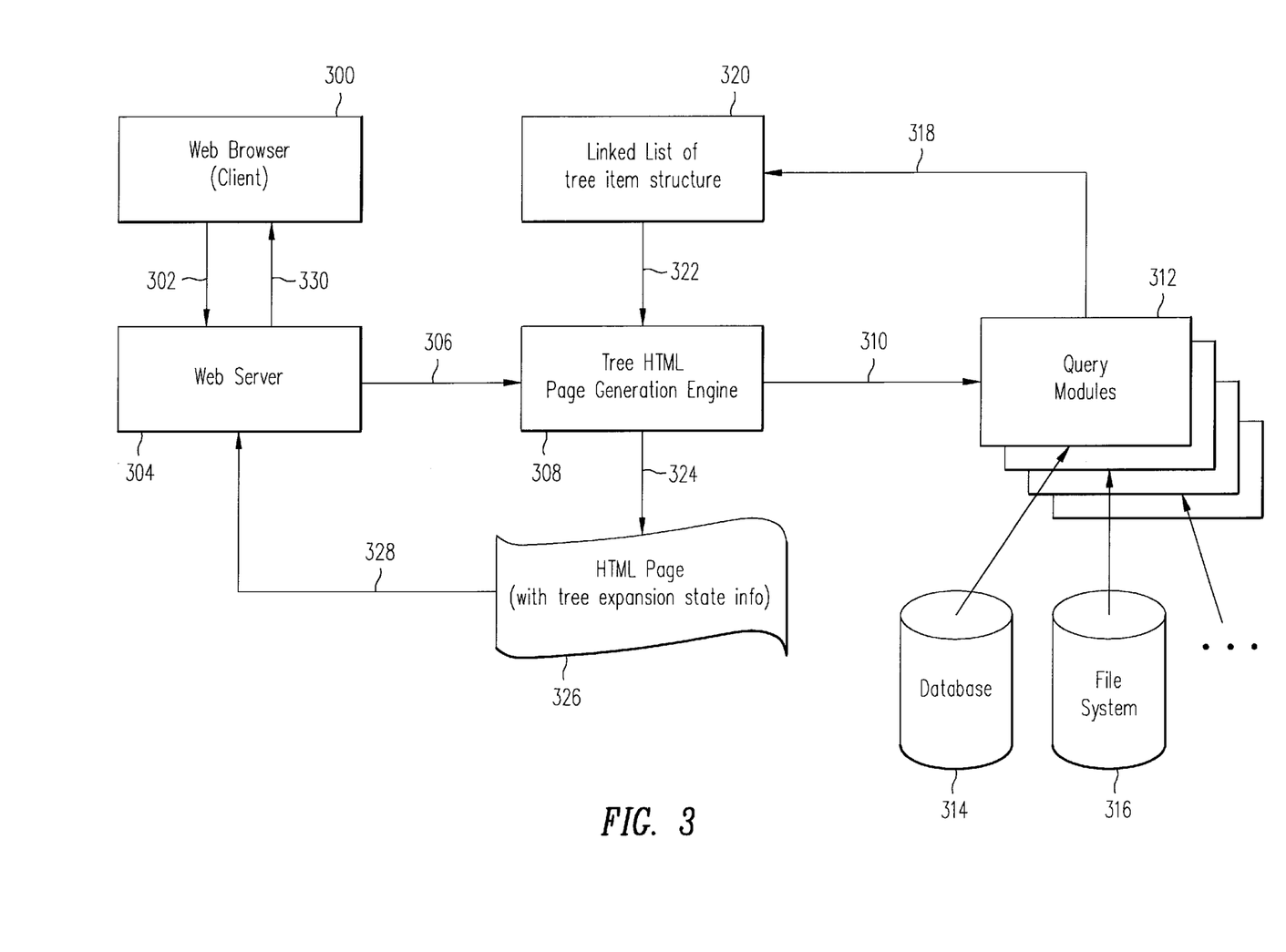
FIG. 3 is a block diagram illustrating a system according to the preferred embodiment.

A system implementing a preferred present embodiment is shown and described in connection with FIG. 3. The client, or web browser 300 can be any type or level of web browser. The web browser 300 sends a request over path 302 to the web or application server 304. The web server 304 extracts the URL from the web browser 300 request and passes it over path 306 to the tree HTML page generator 308. Here, the page generator 308 invokes the query module 312 to access the information system the user seeks information from. The information system can be, for example, a database 314 or a file system 316. A linked list 320 is returned back to the tree HTML page generator, which is then converted into the HTML page 326 that includes the tree expansion state information. The linked list is comprised of a list of pointers to the information. Lastly, the HTML page generation engine 308 returns the page 326 back to the web server which in turn, sends the page back to the web client 300. examples of the visual representation are shown in FIGS. 4(a) through 4(d). As mentioned previously, leaves in the tree view are indicated with plus and minus signs, while the leaves are indicated by line access in the tree. FIG. 4(a) shows the initial representation of the page generated by the HTML page generation engine 308.

The expansion and contraction states for the navagation tree is maintained as a list of 0's and 1's imbedded as a certain component in the HTML URL. 1's represent "open" tree branches (where subtree elements are shown) and 0's represent closed branches (where subtree elements are not shown. Because the number of sub-elements for any given internal branch are known, the number of 0's and 1's that follow an open branch are deterministic. This simple encoding allows one to understand the current expansion state of the tree given the list of 0's and 1's An example follows.

Assume that the application has a navigational tree structure shown below:

```
TOP
   +−A.
      +−A1
      +−A2
   +−B
      +−B1
         +−B11
         +−B12
      +−B2
         +−B21
         +−B22
```

The tree is shown in its fully-extended format. The bit string representation for this would be the following: 1111.

The first 1 represents the expanded state for the A node. Since there are no expandable nodes below A no more bits are needed to represent the A subtree. The second 1 represents the expansion state of tree B. Note that tree B has 2 subtrees that can be in an expanded or collapsed state. The two remaining 1's indicate the expanded state of the B's two subtrees B1 and B2. If there were a top node C we would still know that the 3rd and 4th 1's correspond to B's subtrees because we know that B has 2 subtrees (this is fixed in the application—deterministic). If the given tree was contracted at node A and node B1, the visual affect would be the following:

```
TOP
   +-A
   +-B
      +-B1
      +-B2
         +-B21
         +-B22
```

The bit string representation would be: 0101. The first 0 indicates that the A subtree is collapsed. The second 1 indicates that the B subtree is expanded. Since the B subtree has 2 additional collapsible subtrees under it we know that the next 2 bits correspond to them. The third 0 indicates that subtree B1 is collapsed and the last 1 indicates that the B2 subtree is expanded.

Lastly, the following represents the case where the B subtree itself is collapsed:

```
TOP
   +-A
      +-A1
      +-A2
   +-B
```

The bit string to represent this would be: 10. The first 1 indicates that the A subtree is expanded and the second 0 indicates that the B subtree is collapsed. Note that there are no bits to indicate the state of the B1 and B2 subtrees because they are not visible. As an extension to this example, one might include the expansion or collapse state of the B1 and B2 subtrees so that if the B tree were to be expanded again, the subtrees would be displayed in their original expanded or collapsed state.

FIG. 5 shows an example of a portion of the HTML page that would display as the screen shown in FIG. 4(a). The HTML page of FIG. 5 illustrates one example of how the tree expansion states can be imbedded directly into the HTML page, which is passed back to the browser to allow for the dynamic expansion and collapsing of the tree view when displayed.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. A method for generating a tree view for a web browser comprising the steps of:

receiving a request for information from a web browser;

searching an information system based on the information requested;

generating a linked list of the searching results;

building an HTML page from the linked list which includes pointers to the information searched; and returning the HTML page to the web browser.

2. The method for generating a tree view for a web browser as claimed in claim 1, wherein the request for information contain a URL.

3. The method for generation a tree view for a web browser as claimed in claim 1, wherein the HTML page includes nodes and branches to access additional levels of information.

4. The method for generating a tree view for a web browser as claimed in claim 1, wherein the information system is a database.

5. The method for generating a tree view for a web browser as claimed in claim 1, wherein the information system is a network domain.

6. The method for generating a tree view for a web browser as claimed in claim 1, wherein the information system is a file system.

7. A method for generating a tree view for a web browser comprising the steps of:

receiving a request for information at a web server from a client browser, said request containing a URL for the information;

invoking an HTML page generation engine to build an HTML page for visual presentation of the information;

executing a query module from the page generation engine to an information system to search for the requested information;

building a linked list from the results of the query module;

generating an HTML page from the link listed information, said HTML page having embedded pointers to tree expansion state information; and returning the HTML page to the client browser.

8. The method for generating a tree view for a web browser as claimed in claim 7, wherein the information system is a database.

9. The method for generating a tree view for a web browser as claimed in claim 7, wherein the information system is a network domain.

10. The method for generating a tree view for a web browser as claimed in claim 8, wherein the information system is a file system.

11. A system for generating a tree view for a web browser comprising:

an application server for receiving a request for information from a client browser and returning an HTML page back to the client browser; and an HTML page generator comprising query modules for searching an information system and building linked lists from the results, said HTML page generator having means for embedding information state information from the linked lists into the generated HTML page.

12. A computer product comprising:

a computer usable medium; and a computer readable code embodied on the computer usable medium, said readable code configured to cause the computer to construct a dynamic tree view from a linked list by embedding tree expansion states into an HTML page.

13. The computer product of claim 12 further comprising code to cause the computer to send the HTML page to a browser.

* * * * *